May 5, 1942.  G. O. HELBING ET AL  2,282,051
COMBINED EJECTOR AND INDICATOR FOR FILM HANDLING APPARATUS
Filed April 26, 1939
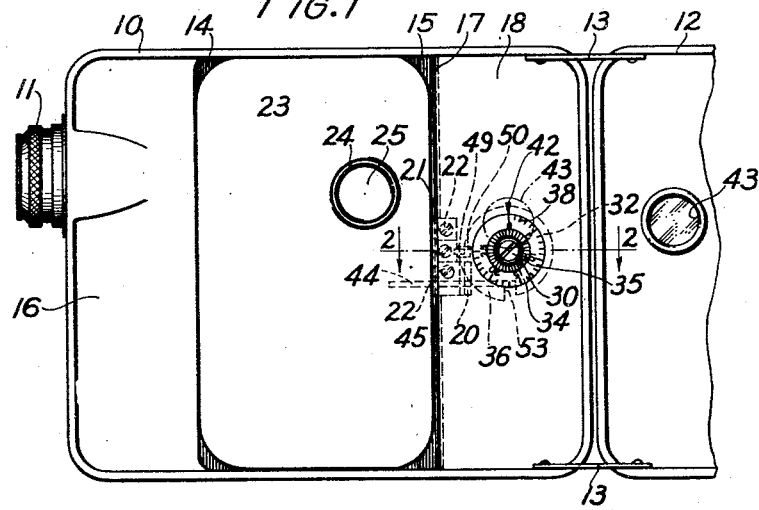
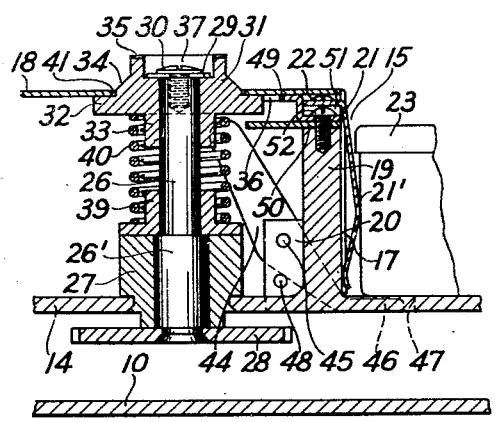
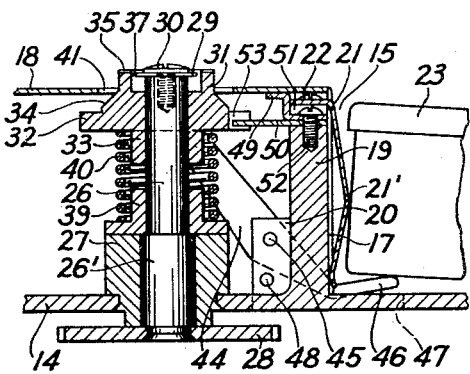
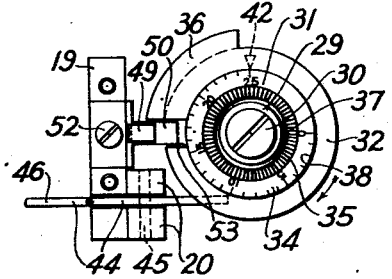
GRAYSON O. HELBING
ALOYSIUS E. LECHLEITNER
INVENTORS
BY
ATTORNEYS

UNITED STATES PATENT OFFICE 2,282,051

COMBINED EJECTOR AND INDICATOR FOR FILM HANDLING APPARATUS

Grayson O. Helbing and Aloysius E. Lechleitner, Rochester, N. Y., assignors to Eastman Kodak Company, Rochester, N. Y., a corporation of New Jersey Application April 26, 1939, Serial No. 270,124

12 Claims. (Cl. 95—31)

The present invention relates to a combined indicating means and ejecting means for a film handling apparatus of the magazine type and more particularly to an indicating means and ejecting means which have at least one element in common.

While ejectors and indicators per se are well known in the art, the combination thereof particularly so that said indicating means and ejecting means have common elements has not previously been proposed.

The primary object of the present invention is the provision of a combined indicating means for indicating an operating condition of a film handling apparatus and an ejecting means for displacing the film magazine with respect to said apparatus, both of which means include an element constituting an operative part thereof.

Another object of the invention is the provision of a combined indicating means and ejecting means including a common element which is movable in one sense to indicate an operating condition of a film apparatus and which is movable in another sense for displacement of a film magazine with respect to said apparatus.

A further object of the invention is the provision of a combined indicating means and ejecting means including a common element which co-operates with parts on the casing of a film handling apparatus to prevent displacement of a film magazine by the ejecting means until the indicating means has been moved to a predetermined position.

Other and further objects of the invention will be suggested to those skilled in the art by the following description.

The above and other objects of the invention are embodied in a film handling apparatus of the magazine type and comprising in combination a casing providing a magazine chamber, an indicating means for indicating an operating condition of the apparatus, an ejecting means for displacing a film magazine with respect to the magazine chamber, an element mounted for rotation and for axial movement and constituting a part of said indicating means and of said ejecting means, and co-operating parts on said element and on said casing and for preventing axial movement of said element except in a predetermined rotational position thereof.

Reference is hereby made to the accompanying drawing wherein similar reference characters designate similar elements and wherein:

Fig. 1 is a side elevation of a magazine camera loaded with a film magazine and having the camera cover in open position.

Fig. 2 is a fragmentary transverse cross section through the combined indicating means and ejecting means and taken on the line 2—2 of Fig. 1.

Fig. 3 is a fragmentary section similar to that of Fig. 2 but showing the operation of the ejecting means.

Fig. 4 is also a fragmentary section through the ejecting means and indicating means and showing the common element during re-setting of the indicating means.

Fig. 5 is a detail plan view showing a common element of the indicating means and of the ejecting means in the ejecting position.

For purposes of illustration, the invention is shown herein as applied to a magazine camera and as including a combined footage indicating means and ejecting means, however, it is to be understood that the invention is equally adaptable to all kinds of film handling apparatus of the magazine type and to all kinds of indicating means for indicating an operating condition of the apparatus.

The film handling apparatus may comprise a casing 10 carrying an objective assembly 11 and a casing cover 12 which may be connected by hinges 13 to the casing 10. Said cover 12 may also be detachably fastened to casing 10 in conventional fashion. Said casing 10 has an internal longitudinally extending mechanism plate 14 which forms one wall of a magazine chamber 15. A front compartment 16 forms the front wall of said magazine chamber 15, while the depending flange 17 of a panel 18 forms the rear wall of said magazine chamber 15. An upstanding wall 19 on mechanism plate 14 includes a pair of lugs 20 and also supports a spring member 21 which is fastened to the top of wall 19 by screws 22 and which has a bend 21' for engaging one wall of a film magazine 23 and for locating the same within the magazine chamber 15. The film magazine 23 may have an embossed ring 24 within which a paper disk 25 is mounted or the area encircled by ring 24 may be prepared in other suitable ways to receive pencil or ink marks.

For proper and efficient operation of a film handling apparatus it is necessary that certain operating conditions thereof be known to the operator. Such operating condition is indicated by some type of indicating means which for the purposes of the present disclosure only is shown as a footage indicator. Such indicating means may comprise a spindle 26 having an enlarged portion 26' which is journaled in a bushing 27 on the mechanism plate 14. A gear 28 is fastened to one end of spindle 26 and meshes with a geared member of the camera operating mechanism, not shown but of conventional design. A washer 29 is attached to the other end of spindle 26 by a screw 30 which is threaded into the end of spindle 26. An operating member 31 is slidably and rotatably mounted upon spindle 26 and comprises a peripheral rim 32, a sleeve portion 33, an inclined surface 34, a serrated ring 35, a peripheral sector 36 and is provided with a central recess 37. A plurality of graduations 38 and corresponding numerals are engraved or otherwise provided on said inclined surface 34. A collar 39 is mounted on spindle 26 and a coil spring 40 encircles spindle 26, the sleeve portion 33 of operating member 31 and a sleeve portion of collar 39 normally to urge said operating member 31 and the upper surface thereof toward or into frictional engagement with the washer 29. The panel 18 is provided with an opening 41 through which the graduated surface 34 of the operating member 31 may extend and said panel 18 carries an index mark 42 for registering with the graduations 38 on said operating member 31.

It is quite evident that rotation of gear 28 by the camera operating mechanism will also rotate spindle 26, washer 29 and, through the frictional connection caused by the pressure of operating member 31 against washer 29, will result in rotation of said operating member 31. In this manner the film footage advanced through the apparatus will be indicated opposite the index mark 42. The frictional connection between washer 29 and operating member 31 will permit re-setting of the footage indicator as desired.

Since the indicating means just described is on or at the internal panel 18, said indicating means could not be observed when the casing cover 12 was closed. Consequently, said cover 12 is provided with a window 43 which lies over the index mark 42 when cover 12 is closed and which permits observation of the graduations 38 which are adjacent to or opposite said index mark 42.

The ejecting means may comprise an ejector arm 44 which is pivotally mounted by a pin 45 between the lugs 20 of wall 19. Said ejector arm 44 has a projection 46 on one end thereof and movable from a slot 47 in mechanism plate 14, see Fig. 2, into the magazine chamber 15 for displacement of a film magazine 23 with respect to said magazine chamber 15, see Fig. 3. The other end of ejector arm 44 is adjacent the peripheral rim 32 of operating member 31. Said ejector arm 44 is moved by insertion of the film magazine 23 into the position shown in Fig. 2 but further movement of the ejector arm is prevented by the stop pin 48. Such free mounting of the ejector arm 44 insures that there will be no interference with the insertion of the film magazine 23. When it is desired to remove the film magazine 23 from the magazine chamber 15, the operating member 31 is moved axially of spindle 26 against the action of coil spring 40 and peripheral rim 32 engages and moves the upper end of ejector arm 44 so that the projection 46 thereon moves into the magazine chamber 15 and displaces the film magazine 23, see Fig. 3.

Thus it will be seen that the operating member 31 constitutes an element both of the indicating means and of the ejecting means. In other words, the operating member 31 is rotated upon operation of the apparatus so that the graduations 38 are rotated with respect to index mark 42 to indicate an operating condition or film footage advancement of the apparatus. Also operating member 31 may be moved axially on spindle 26 for actuation of the ejector arm 44 and displacement of the film magazine 23. Said operating member 31 is consequently moved in a rotational sense as part of the indicating means and in an axial or longitudinal sense as part of the ejecting means.

In order to remind the operator that the indicating means should be re-set for each new magazine inserted, certain inter-locks are provided so that the ejecting means can be operated only after certain re-setting operations have been performed. An abutment arm 49 and a stop member 50 are mounted in a recess 51 in the top of wall 19 and are fastened to said wall 19 by a screw 52. The abutment arm 49 is located just under panel 18 and engages the forward end of peripheral sector 36, see Fig. 2, when the operating member 31 is rotated in a clockwise direction, indicated by the arrow of Fig. 5, and when said operating member 31 is in its outermost axial position and in engagement with washer 29. Assuming that the indicating means was originally set with the "25" graduation opposite index mark 42, then after a complete run of the film magazine the forward end of peripheral sector 36 will engage and be blocked by the abutment arm 49. During all of this time it is not possible to move operating member 31 in an axial direction sufficiently to move the ejector arm 44 into the magazine chamber 15 because the stop member 50 is under the peripheral rim 32 and prevents such ejecting axial movement of operating member 31. Said operating member 31 may, however, be displaced axially a sufficient distance so that peripheral sector 36 clears the abutment arm 49 and the operating member may be manually rotated to bring the "0" graduation opposite index mark 42. At this time a notch 53 provided in peripheral rim 32 is opposite the stop member 50 and the operating member 31 may now be moved axially a sufficient distance to operate the ejecting means or to move ejector arm 44 so that its projection 46 will displace the film magazine 23.

In the event that it is desired to remove a film magazine before it has been completely exposed, the operating member 31 must be rotated and slightly depressed before the member 31 can be moved to the "0" position and so that the ejecting means can be operated. As a result, the operator will be reminded to record the used or unused film footage of that magazine upon the paper disk 25 of magazine 23. Then when a partially used magazine is re-inserted into the camera, the member 31 of the indicating means may be re-set to the corresponding position so that no film will be wasted.

Particular attention is directed to the fact that the frictional connection between spindle 26 and operating member 31 is dis-engaged when the member 31 is depressed axially so that re-setting of the graduated operating member 31 may be more readily accomplished. Also such dis-engagement of the friction connection eliminates any tendency to turn spindle 26 and gear 28 during such re-setting of the indicating means.

Obviously, the multiple functions of the operating member 31 simplifies the construction and operation of the combined indicating means and ejecting means of the invention. The coil spring 40 also serves a dual purpose, one to maintain the frictional connection between washer 29 and operating member 31 and the other to return said operating member 31 to a non-ejecting position after a film magazine has been removed. Many variations or modifications of the disclosed constructions are possible but are within the scope of the invention as defined in the appended claims.

Having now particularly described our invention what we desire to secure by Letters Patent of the United States and what we claim is:

1. In a film handling apparatus of the magazine type, the combination with a casing providing a magazine chamber, and an indicating means on said casing and for indicating an operating condition of said apparatus, of an ejecting means on said apparatus and for displacing a film magazine with respect to said magazine chamber, and an element constituting a part of said indicating means and movable in one sense to indicate said operating condition of the apparatus, and constituting also a part of said ejecting means and movable in another sense for displacement of a film magazine with respect to said magazine chamber.

2. In a film handling apparatus of the magazine type, the combination with a casing providing a magazine chamber, and an indicating means on said casing and for indicating an operating condition of said apparatus, of an ejecting means on said apparatus and for displacing a film magazine with respect to said magazine chamber, and an element mounted for rotation and for axial movement, constituting a part of said indicating means and rotatable to indicate said operating condition of the apparatus, and constituting also a part of said ejecting means and movable axially to operate the same for displacement of a film magazine with respect to said chamber.

3. In a film handling apparatus of the magazine type, the combination with a casing providing a magazine chamber, and an ejecting means including an arm movable into said magazine chamber for displacement of a film magazine, of an indicating means on said casing and comprising a spindle, a friction abutment thereon, and a graduated member axially movable on said spindle for actuation of said arm of the ejecting means, and a resilient member normally urging said graduated member against said friction abutment and opposing axial movement of said graduated member.

4. In a film handling apparatus of the magazine type, the combination with a casing providing a magazine chamber and having a panel adjacent said chamber and provided with an opening, and an ejecting means including an arm movable into said magazine chamber for displacement of a film magazine, of an indicating means on said casing and including a graduated member movably mounted with respect to said panel and for actuating said arm of the ejecting means, and a resilient member normally urging said graduated member into the opening of said panel.

5. In a film handling apparatus of the magazine type, the combination with a casing providing a magazine chamber, an indicating means on said casing and for indicating an operating condition of said apparatus, and an ejecting means in said casing and for displacing a film magazine with respect to said magazine chamber, of an element mounted for rotation and for axial movement and constituting a part of said indicating means and of said ejecting means, and cooperating parts on said element and on said casing and for preventing axial movement of said element except in a predetermined rotational position thereof.

6. In a film handling apparatus of the magazine type, the combination with a casing providing a magazine chamber, an indicating means on said casing and for indicating an operating condition of said apparatus, and an ejecting means in said casing and for displacing a film magazine with respect to said magazine chamber, of an element mounted for rotation and for axial movement, constituting a part of said indicating means and of said ejecting means, and having a peripheral rim provided with a notch, and a stop member on said casing for engaging said rim to prevent axial ejecting movement of said element unless said notch is in registry with said stop member.

7. In a film handling apparatus of the magazine type, the combination with a casing providing a magazine chamber and carrying an index mark, and an ejecting means on said apparatus and for displacing a film magazine with respect to said magazine chamber, of a footage indicating means including a graduated member mounted for axial and rotatable movement, axially movable for actuation of said ejecting means and indicating in various rotatable positions the film footage that had been moved through said apparatus, and provided with a notch in definite relation to a predetermined footage graduation on said member, and a stop member located on said casing normally to engage and prevent axial ejecting movement of said graduated member but arranged to enter said notch when said graduated member is rotated to bring said predetermined footage graduation opposite said index mark and is axially moved for actuation of said ejecting means.

8. In a film handling apparatus, the combination with a casing having a panel provided with an opening, an index mark on said panel adjacent said opening, and a footage indicator including a disk member mounted for axial and rotatable movement, having a plurality of graduations arranged with an annular gap between the extreme graduations and including a peripheral sector equal in angular extent to said angular gap, of an abutment located on said casing to engage said peripheral sector when one extreme graduation registers with said index mark but disengaged when said disk member is axially displaced and rotated to bring the other extreme graduation opposite said index mark.

9. In a film handling apparatus of the magazine type, the combination with a casing providing a magazine chamber, and an ejecting arm intermediately pivoted in said casing and having one end arranged to enter said magazine chamber and for displacing a film magazine therein, of an indicating means including a spindle and a graduated member rotatably and axially movable on said spindle and arranged upon axial movement thereof to engage the other end of said ejecting arm and to move said one end thereof into said magazine chamber.

10. In a film handling apparatus of the magazine type, the combination with a casing providing a magazine chamber, and an ejecting arm intermediately pivoted in said casing and having one end arranged to enter said magazine chamber and for displacing a film magazine therein, of an indicating means including a spindle and a graduated member rotatably and axially movable on said spindle and arranged upon axial movement thereof to engage the other end of said ejecting arm and to move said one end thereof into said magazine chamber, and a coil spring encircling said spindle and normally urging said graduated member into a non-ejecting position.

11. In a film handling apparatus of the magazine type, the combination with a casing providing a magazine chamber and having a panel adjacent thereto, and indicating means for indicating an operating condition of said apparatus, and an ejecting means for displacing a film magazine with respect to said chamber, said indicating means and said ejecting means having a common operating member available at said panel, of a casing cover movable to open position to permit access to said panel and magazine chamber, movable to a closed position for enclosing said magazine chamber and covering said panel to render said common operating member inaccessible and provided with an opening through which said operating member may be observed.

12. In a photographic camera of the magazine type, the combination with a casing providing a magazine chamber and having a panel adjacent said chamber and provided with an opening, an index mark on said panel adjacent said opening, and an indicating means comprising a rotatable spindle, a friction shoulder on one end of said spindle, an operating member axially movable on said spindle and including a peripheral rim and a peripheral sector extending from said rim, said peripheral rim being provided with a notch at one end of said sector, a spring member normally urging said operating member against said friction shoulder and through the opening in said panel, and a plurality of graduations on said operating member and arranged to register with said index mark, of an ejecting means comprising an arm intermediately pivoted, having one end for engaging said operating member and having its other end movable into said magazine chamber for displacement of a film magazine upon axial movement of said operating member, an abutment on said casing and for engaging the other end of said peripheral sector to stop said operating member in one predetermined position, and a stop member on said casing for engaging said operating member to prevent axial ejecting movement thereof until said operating member has been moved to a second predetermined position with the notch in said peripheral rim in registry with said stop member.

GRAYSON O. HELBING.
ALOYSIUS E. LECHLEITNER.